Figure 1:
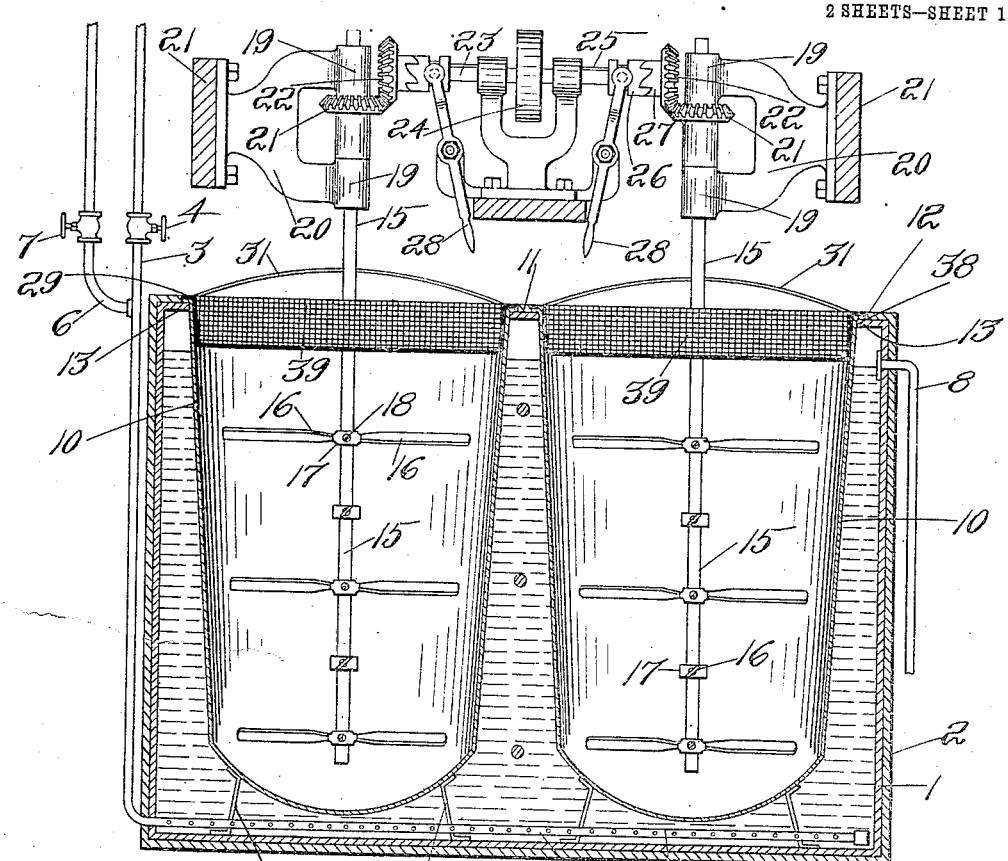

C. J. DIONNE.
HEATING AND STORAGE SYSTEM FOR CHOCOLATE COMPOSITION COATINGS.
APPLICATION FILED APR. 30, 1909.

943,239.

Patented Dec. 14, 1909.

2 SHEETS—SHEET 1.

Witnesses:
John H. Parker
Aline Tarr

Inventor:
Charles J. Dionne
by Macleod, Calver, Copeland & Dike
Attorneys.

C. J. DIONNE.
HEATING AND STORAGE SYSTEM FOR CHOCOLATE COMPOSITION COATINGS.
APPLICATION FILED APR. 30, 1909.

943,239.

Patented Dec. 14, 1909.

2 SHEETS—SHEET 2.

UNITED STATES PATENT OFFICE.

CHARLES J. DIONNE, OF CAMBRIDGE, MASSACHUSETTS, ASSIGNOR TO UNITED DRUG COMPANY, OF BOSTON, MASSACHUSETTS, A CORPORATION OF NEW JERSEY.

HEATING AND STORAGE SYSTEM FOR CHOCOLATE-COMPOSITION COATINGS.

943,239.  Specification of Letters Patent.  Patented Dec. 14, 1909.

Application filed April 30, 1909. Serial No. 493,178.

*To all whom it may concern:*

Be it known that I, CHARLES J. DIONNE, citizen of the United States, residing at Cambridge, in the county of Middlesex, Commonwealth of Massachusetts, have invented a certain new and useful Improvement in Heating and Storage Systems for Chocolate-Composition Coatings, of which the following is a specification, reference being had therein to the accompanying drawings.

Chocolate coating is the term applied to the chocolate composition used for coating chocolate drops, bonbons, and other confections having a chocolate covering, the composition usually consisting of cocoa-butter, chocolate liquor, sometimes with flavoring added and also sugar if a sweet coating is desired. These ingredients are all melted and mixed thoroughly together and the coating is applied to the centers while in a warm melted condition because the mixture hardens when it becomes col. It is very desirable to keep the coating in a melted state continuously from the time that it is first melted until it is used, because the quality is impaired if it is allowed to cool and then remelted. It is also desirable to retain it at a substantially uniform temperature; that is, at approximately the temperature at which it is to be used which is preferably about 110 degrees or a little higher. The mixture forms a sort of semi-liquid which thickens as it cools and which even in its warm state has particles held in suspense which if the composition is allowed to stand stagnant tend to settle and form a sediment in the bottom of the container.

The object of the present invention is to provide a storage tank in which the coating may be heated and kept heated continuously at the proper temperature until desired to be used and from which the liquid may be drawn off from time to time as desired for use and may be replenished by additional supply to take the place of what has been drawn off; also to provide means for keeping the composition continuously agitated to prevent settling.

The invention will be fully understood from the following description taken in connection with the accompanying drawings, and the novel features are pointed out and clearly defined in the claims at the close of the specification.

Figure 2:
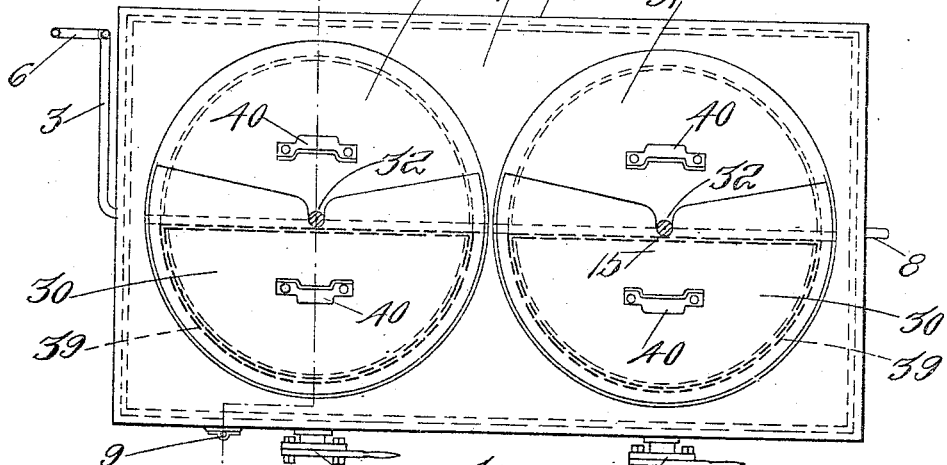
Figure 5:
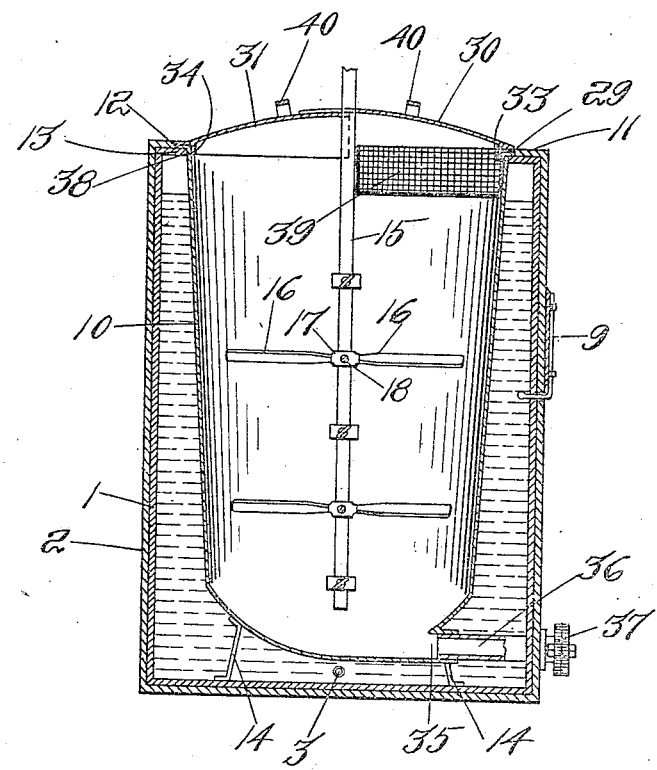

In the drawings, Figure 1 is a vertical longitudinal section of apparatus embodying the invention. Fig. 2 is a plan. Fig. 3 is a vertical cross-section on line 3—3 of Fig. 2.

The drawings show two storage tanks embodying the invention combined with a single heating tank. In practice the number of storage tanks may either be one only or any number desired according to the amount of business carried on or according to whether the manufacturer desires to have a number of independent heating tanks with a small number of storage tanks for each heater or whether he prefers to have a larger heater with a larger number of storage tanks.

Referring now to the drawings,—1 is the heater tank which is of any suitable material but preferably is of copper or boiler-iron and provided with a jacket 2 of wood or other non-conducting material to minimize the radiation of heat from the tank. The hot water tank is kept supplied with hot water at the proper temperature by any suitable means. In the apparatus shown a water pipe 3, which may be connected with one of the regular water pipes of the factory and connected with the city water supply, leads into the hot water tank at or near the bottom, and the supply of water thereto may be controlled by a cock 4. Preferably the discharge from the pipe 3 into the hot water tank is through a series of small holes or orifices 5 at short intervals apart, the pipe 3 extending the full length of the tank 1 along near the bottom. The purpose of having the discharge from the pipe into the tank through a large number of small orifices is to distribute the inflowing water more uniformly over the bottom of the tank than if it were all discharged by a single large outlet. These orifices preferably are about 1/16 of an inch in diameter and located,— say 6 inches apart. The size of the orifices, however and the number and the distance apart may be varied. The exact location of the portion of the pipe 3 which passes through the tank is immaterial. It may be higher or lower than shown, and it may be varied in form without departing from the invention.

Connected with the water pipe 3 below the cock 4 is a steam pipe 6 provided with a cock 7 through which steam may be admitted as desired to mingle with and heat the water before it enters the hot water tank. The steam pipe 6 may lead from a steam boiler or from any suitable supply of steam. Instead of supplying steam the pipe 6 may, if preferred be connected with a hot water boiler so that hot water will be introduced and mingled with the cold water instead of steam, the main purpose being to have some means of heating the water and regulating the temperature of the water admitted to the hot water tank and of retaining it at the proper temperature.

Leading from the hot water tank near the upper end is an outlet pipe 8. Preferably there should be a continual inflow and outflow so as to keep the water at a substantially uniform temperature.

Secured to the side of the hot water tank is a thermometer 9, whose bulb extends into the inside of the hot water tank to indicate the temperature. The storage tanks 10 which hold the composition are made of any suitable metal, preferably copper, lined with tin. Each storage tank is supported within the hot water tank in such manner that it will be surrounded by hot water both on the sides and at the bottom. In the form of construction shown, the hot water tank is provided with a top 11 formed with a series of circular openings 38 something after the manner of the pot holes in the top of a range, to receive the storage tanks 10, and the storage tanks 10 are formed with an annular flange 12 which laps over onto the rim 13 of the hot water tank around the pot hole. Preferably, also for the principal support of the storage tank 10, and to relieve the strain of the flange 12 on the rim 13 of the pot holes, it is supported on legs 14 rising from the bottom of the hot water tank, the bottom of the storage tank being somewhat above the bottom of the hot water tank so that the hot water will be in contact with the bottom of the storage tank.

Extending down into the storage tank is a rotary shaft 15 carrying a plurality of stirrers or paddles 16 which may be attached to a hub 17 adjustably secured to the shaft 15 by a set screw 18, whereby the height and relative distances apart of the paddles may be varied. The upper end of the shaft 15 is supported and journaled in bearings 19 on a bracket 20 secured to a suitable support 21.

The shaft 15 may be rotated by any suitable mechanism. In the apparatus shown a bevel gear 21 is fixedly mounted upon the shaft 15 and engages with a bevel gear 22 which is loose on shaft 23. Shaft 23 is continuously rotated by power communicated to a pulley or wheel 24 fast on the shaft 23. Slidably mounted on the shaft 23, but keyed thereto as by a key 25, so as to rotate with said shaft, is a clutch 26 which is adapted to be engaged with a clutch member 27 fast to or integral with the hub of the bevel gear 22. The clutch member 26 may be thrown into and out of engagement with the clutch member 27 by hand lever 28. When the clutch member 26 is engaged with the clutch member 27, the stirrer shaft 15 will rotate. The purpose of the stirrer blades or paddles is to agitate the liquid in the storage tank so as to prevent the solid ingredients from settling in the bottom and to keep the liquid at the same density throughout. These stirrer blades revolve in a horizontal plane but are preferably so formed as to cut the liquid at an angle as they rotate.

The mixture is poured into the storage tank from the top, and in order to prevent lumps or any pieces of foreign matter from passing into the storage tank, it is preferable to provide a sieve 39 of suitable fineness of mesh in the top of the storage tank to strain the composition when it is poured in. Preferably this strainer is cup-shaped or dished so as to set down into the tank a short distance instead of being flat, and is preferably removable, being formed with a flange 29 which rests upon the flange 12 of the storage tank as a support. It must be made to allow the passage of the shaft 15 and preferably the sieve is semi-circular, extending over only one-half of the upper end of the storage tank, as shown in Fig. 3, and in dotted lines in Fig. 2, and the shaft 15 stands just at one side of it.

On the top of the storage tank is a cover to prevent evaporation and radiation. This cover is preferably made in two parts 30 and 31, between which the shaft 15 passes, so that each one may be lifted off without interfering with the shaft. The cover 31 covers about half of the top of the tank; that is, is semi-circular in plan view and the inner edge of the cover 30 laps over upon the inner edges of the cover 31 as shown in plan view in Fig. 2, and in section in Fig. 3, and is formed with a curved slot 32 to allow the passage of the shaft 15. The cover portion 30 is formed with a downwardly extending flange 33 to fit within the rim of the sieve 39 and the cover portion 31 is formed with a downwardly extending flange 34 to fit within the rim of the storage tank. Each cover is provided with a handle 40 whereby it may be lifted from the tank.

In the lower part of the storage tank at or near the bottom and at one side is an outlet orifice 35 from which an outlet pipe 36 leads through the side of the tank to draw off the composition as desired and provided with a cock 37 to control the outlet.

The usually preferred temperature of the coatings for use is about 110 degrees, but there is no special impairment of the mixture if the temperature is allowed to somewhat exceed that degree. In order to prevent the temperature from falling below 110 degrees when there is an interval of one or two days that the mixture is not being drawn, as for instance over Sundays or holidays, and in order to avoid the necessity of keeping fire in the boiler during such interval, the temperature may be raised somewhat, say to about 140 degrees before shutting down, and the volume of water in the hot water tank is sufficient so that it will retain the heat for a day or two sufficient to prevent the temperature of the mixture in the storage tank from falling below 110 degrees.

While I have described the apparatus as especially intended for the storage of chocolate coating composition, it is obvious that the apparatus may be employed as a heat storage for any composition, liquid or semi-liquid, for which it is adapted.

What I claim as my invention is:

1. In apparatus of the character described, a water supply, a water tank, a water pipe leading from said supply into the lower part of said water tank and extending for some distance into the tank and provided with a plurality of outlet orifices from said pipe into the tank, a steam pipe connected with said water pipe outside of the water tank, means for regulating and controlling the flow of water from the water pipe into the tank, means for regulating and controlling the flow of steam into the water pipe, a discharge pipe leading from the water tank near the top thereof on the opposite side of the tank from the inlet, said tank being closed against discharge except at the upper part whereby the water tank may be kept full of running water of predetermined regulated temperature, a storage tank supported within the water tank, the storage tank being of less diameter than the interior of the water tank, the bottom of the storage tank being elevated above the bottom of the water tank, whereby a continuous free circulation of water of regulated temperature may be had into and out of the water tank and around the storage tank.

2. In apparatus of the character described, a water tank, a water pipe leading into the lower part of said water tank and extending for some distance into the tank and provided with a plurality of outlet orifices from said pipe into the tank, a steam pipe connected with said water pipe outside of the water tank, means for regulating and controlling the flow of water from the water pipe into the tank, means for regulating and controlling the flow of steam into the water pipe, a discharge pipe leading from the water tank near the top thereof on the opposite side of the tank from the inlet, said tank being closed against discharge except at the upper part, a storage tank supported within the water tank, the storage tank being of less diameter than the interior of the water tank, the bottom of the storage tank being elevated above the bottom of the water tank, whereby a continuous free circulation of hot water may be had into and out of the water tank and around the storage tank, and a valve controlled draw-off pipe leading from the lower part of the storage tank at one side thereof and passing through the wall of the water tank, a segmental cup-shaped strainer fitted within a portion of the rim of the storage tank and having a flange which rests upon the rim of said tank, a rotary shaft extending down into the storage tank provided with paddle blades, means for rotating said shaft and paddle blades, a two-part removable cover to the storage tank above the strainer, one member of which covers a portion of the top of the storage tank and the other member of which covers the remaining portion of the top of the storage tank and laps over onto said first member and is formed with a slot for the passage of said rotary shaft.

3. In apparatus of the character described, a storage tank, a rotary shaft extending down into the storage tank provided with paddle blades secured thereto, means for rotating said shaft, a segmental cup-shaped strainer fitted within a portion of the rim of the storage tank and having a flange which rests upon the rim of said tank, a rotary shaft extending down into the storage tank provided with paddle blades, means for rotating said shaft and paddle blades, a two-part removable cover to the storage tank above the strainer, one member of which covers a portion of the top of the storage tank and the other member of which covers the remaining portion of the top of the storage tank and laps over onto said first member and is formed with a slot for the passage of said rotary shaft.

In testimony whereof I affix my signature, in presence of two witnesses.

CHARLES J. DIONNE.

Witnesses:
 WILLIAM A. COPELAND,
 ALICE H. MORRISON.